United States Patent
Nam et al.

(10) Patent No.: US 9,836,023 B2
(45) Date of Patent: Dec. 5, 2017

(54) APPARATUS AND METHOD FOR GENERATING WIDE-ANGLE COHERENT LIGHT AND DISPLAY APPARATUS USING WIDE-ANGLE COHERENT LIGHT

(71) Applicant: SAMSUNG ELECTRONICS CO., LTD., Suwon-si (KR)

(72) Inventors: Dong Kyung Nam, Yongin-si (KR); Ho Cheon Wey, Seongnam-si (KR); Seok Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 14/281,004

(22) Filed: May 19, 2014

(65) Prior Publication Data

US 2014/0347714 A1  Nov. 27, 2014

(30) Foreign Application Priority Data

May 23, 2013 (KR) .................. 10-2013-0058513
Nov. 1, 2013 (KR) .................. 10-2013-0132351

(51) Int. Cl.
  *G03H 1/10* (2006.01)
  *G03H 1/22* (2006.01)
  *G03H 1/02* (2006.01)

(52) U.S. Cl.
  CPC ............ *G03H 1/2286* (2013.01); *G03H 1/02* (2013.01); *G03H 2001/0212* (2013.01); *G03H 2001/0216* (2013.01); *G03H 2001/0224* (2013.01); *G03H 2222/34* (2013.01); *G03H 2223/19* (2013.01); *G03H 2225/55* (2013.01)

(58) Field of Classification Search
  CPC ...... G03H 1/02; G03H 1/2286; G03H 1/2294; G03H 2001/0208; G03H 2001/0212; G03H 2001/0216; G03H 2001/0224; G03H 2222/34; G03H 2223/19; G03H 2225/55
  USPC .................. 359/9–11, 21–25, 27, 32–33, 35
  See application file for complete search history.

(56) References Cited

U.S. PATENT DOCUMENTS

| | | | |
|---|---|---|---|
| 3,698,787 A | 10/1972 | Mueller et al. | |
| 4,498,740 A | 2/1985 | Caulfield | |
| 5,504,602 A | 4/1996 | Farmer | |
| 7,400,431 B2* | 7/2008 | Schwerdtner ............ | G03H 1/22 348/E13.03 |
| 8,125,698 B2 | 2/2012 | Huang et al. | |
| 8,218,211 B2 | 7/2012 | Kroll et al. | |

(Continued)

FOREIGN PATENT DOCUMENTS

| | | |
|---|---|---|
| CN | 100422877 C | 10/2008 |
| JP | 2001-183605 | 7/2001 |

(Continued)

OTHER PUBLICATIONS

Schwerdtner et al., Eye-Tracking Solutions for Real-Time Holographic 3-D Display, 2008 SID, SID 08 Digest, pp. 345-347.*

(Continued)

*Primary Examiner* — Derek S Chapel
(74) *Attorney, Agent, or Firm* — NSIP Law

(57) ABSTRACT

A method and apparatus for generating coherent light, and a display apparatus using coherent light are provided. A wide-angle coherent light generation apparatus may focus parallel light onto a focal point, and may generate coherent light at a wide angle, using an optical device.

36 Claims, 11 Drawing Sheets

(56) References Cited

U.S. PATENT DOCUMENTS

| | | | |
|---|---|---|---|
| 8,218,212 B2* | 7/2012 | Kroll | G03H 1/02 |
| | | | 359/29 |
| 8,294,966 B2* | 10/2012 | Kroll | G03H 1/2205 |
| | | | 359/32 |
| 8,339,695 B2* | 12/2012 | Haussler | G02B 5/32 |
| | | | 345/418 |
| 8,351,103 B2* | 1/2013 | Leister | G03H 1/2294 |
| | | | 359/32 |
| 9,465,361 B2* | 10/2016 | Smithwick | G03H 1/0808 |
| 2002/0001110 A1 | 1/2002 | Metz et al. | |
| 2009/0225380 A1* | 9/2009 | Schwerdtner | G03H 1/2286 |
| | | | 359/9 |
| 2010/0149313 A1* | 6/2010 | Kroll | G03H 1/2294 |
| | | | 348/40 |
| 2010/0194854 A1* | 8/2010 | Kroll | G02B 26/005 |
| | | | 348/40 |
| 2010/0277779 A1 | 11/2010 | Futterer et al. | |
| 2012/0044550 A1 | 2/2012 | Mizuta et al. | |
| 2012/0105929 A1 | 5/2012 | Sung et al. | |

FOREIGN PATENT DOCUMENTS

| | | |
|---|---|---|
| KR | 10-2006-0062102 | 6/2006 |
| KR | 10-1208832 | 11/2011 |
| TW | M421904 U1 | 2/2012 |
| TW | M438990 U1 | 10/2012 |

OTHER PUBLICATIONS

Extended European Search Report issued Sep. 9, 2014 in corresponding European Patent Application No. 14168341.7.
R. Oi, et al "Wide viewing-zone angle hologram generation using phase-shifting hologram capture for holographic media communications" pp. 1-10.
A. Schwerdtner, R. Haussler, N. Leister "Large Holographic Displays for Realtime Applications", pp. 1-8.
M. Sich "Interactive Holography—Pursuit of a Dream", pp. 62-65.
Taiwanese Office Action dated Oct. 5, 2017, in corresponding Taiwanese Application No. 103117989 (5 pages in English, 7 pages in Taiwanese).

* cited by examiner

APPARATUS AND METHOD FOR GENERATING WIDE-ANGLE COHERENT LIGHT AND DISPLAY APPARATUS USING WIDE-ANGLE COHERENT LIGHT

CROSS-REFERENCE TO RELATED APPLICATIONS

This application claims the priority benefit of Korean Patent Application No. 10-2013-0058513, filed on May 23, 2013, and Korean Patent Application No. 10-2013-0132351, filed on Nov. 1, 2013, in the Korean Intellectual Property Office, the disclosures of which are incorporated herein by reference.

BACKGROUND

1. Field

Example embodiments of the following description relate to a method and apparatus for generating coherent light at a wide angle, and a display apparatus using the coherent light.

2. Description of the Related Art

Three-dimensional (3D) display technologies are applied to various image display fields, for example, movies, televisions (TVs), mobile phones, and the like. A purpose of 3D display, ultimately, is to enable a person to experience a 3D effect as if he or she is in a real environment and accordingly, research is being conducted on a large variety of technologies including, for example, a stereo scheme, a multi-view scheme, and the like.

However, since a viewpoint-based imaging technology uses only information on light two-dimensionally (2D) projected in a predetermined point in a space, all 3D light information may not be represented, which may cause issues such as unnatural 3D representation, visual fatigue during viewing of 3D images, and the like.

A holography is representatively used as a technology of restoring 3D spatial light information to the form of real light. Holography may restore light in a space, based on interference, that is, a wavelike nature of light. The concept of a hologram was initially proposed by Dennis Garbor in 1948, however, a holographic display has yet to be commercialized.

SUMMARY

The foregoing and/or other aspects are achieved by providing a coherent light generation apparatus including a backlight unit to generate parallel light, and a coherent light generator to focus the parallel light onto a focal point, and to generate coherent light so that a hologram is formed based on interference of light propagated from the focal point.

The coherent light generator may be a lens to focus the parallel light onto the focal point, based on a phase difference caused by a difference between lengths of optical paths through which the parallel light travels in two media with different refractive indices.

The coherent light generation apparatus may further include a pixel. The coherent light generator may be placed in a rear side of a surface on which the pixel is placed, and may focus the parallel light passing through the pixel onto the focal point.

The coherent light generation apparatus may not include a slit.

The coherent light generation apparatus may further include a plurality of pixels, and the coherent light generator may be formed for each of the plurality of pixels.

The coherent light generation apparatus may further include a pixel. The coherent light generator may be located in a front side of a surface on which the pixel is placed, and may focus the parallel light onto the focal point before the parallel light passes through the pixel.

The lens may include at least one of a convex lens and a concave lens.

The coherent light generator may include a phase modulator to change a refractive index of a central portion of an optical axis and a refractive index of a peripheral portion of the optical axis so that the refractive indices are different from each other, and to focus the parallel light onto the focal point based on a phase difference caused by a position of an optical path through which the parallel light travels.

The coherent light generator may include a phase modulating grating to focus the parallel light onto the focal point, based on a phase difference caused by a difference between lengths of a plurality of different optical paths through which the parallel light travels.

The coherent light generator may include an amplitude modulating grating to focus the parallel light onto the focal point, based on an amplitude difference, by blocking a part of a plurality of optical paths through which the parallel light travels.

The light propagated from the focal point may have a wide angle of at least 15°. The light propagated from the focal point may have a wide angle of at least 30°. The light propagated from the focal point may have a wide angle of at least 60°.

The coherent light generation apparatus may further include a plurality of pixels. Each of the plurality of pixels may have a width of at least 10 micrometers (μm).

The foregoing and/or other aspects are achieved by providing a coherent light generation method, including generating parallel light, and focusing the parallel light onto a focal point and generating coherent light so that a hologram is formed, based on interference of light propagated from the focal point.

The focusing may include focusing, by a lens, the parallel light onto the focal point, based on a phase difference caused by a difference between lengths of optical paths through which the parallel light travels in two media with different refractive indices.

The focusing may include changing, by a phase modulator, a refractive index of a central portion of an optical axis and a refractive index of a peripheral portion of the optical axis so that the refractive indices are different from each other, and focusing the parallel light onto the focal point based on a phase difference caused by a position of an optical path through which the parallel light travels.

The focusing may include focusing, by a phase modulating grating, the parallel light onto the focal point, based on a phase difference caused by a difference between lengths of a plurality of different optical paths through which the parallel light travels.

The focusing may include focusing, by an amplitude modulating grating, the parallel light onto the focal point, based on an amplitude difference, by blocking a part of a plurality of optical paths through which the parallel light travels.

The foregoing and/or other aspects are achieved by providing a display apparatus using coherent light, including a backlight unit to generate parallel light, a spatial light modulator to modulate a phase or an amplitude of the parallel light passing through a plurality of pixels, the spatial light modulator including the plurality of pixels, a coherent light generator to focus the parallel light, having the modulated phase or the modulated amplitude, onto a focal point, and to generate coherent light for each of the plurality of pixels so that the parallel light is propagated from the focal point, and a display unit to display a three-dimensional (3D) image in a space, based on interference of the wide-angle coherent light generated for each of the plurality of pixels.

The foregoing and/or other aspects are achieved by providing a coherent light generating apparatus that includes a pixel disposed on a planar surface, a backlight unit to generate coherent and collimated light of a single wavelength that is parallel to the planar surface on which the pixel is disposed, and a coherent light generator to focus the parallel light onto a focal point and to generate coherent light, wherein the coherent light generator is disposed at a side of the planar surface to correspond to the pixel.

The foregoing and/or other aspects are achieved by providing a display apparatus that includes a plurality of pixels disposed in a grid-like pattern on a planar surface, a backlight unit to generate coherent and collimated light of a single wavelength that is parallel to the planar surface on which the pixels are disposed, a plurality of coherent light generators to focus the parallel light onto a focal point to generate coherent light, wherein each of the coherent light generators is positioned at a side of the planar surface to correspond to one of the plurality of pixels, and a display unit to display a three-dimensional (3D) image based on interference of the coherent light generated for each of the plurality of pixels.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
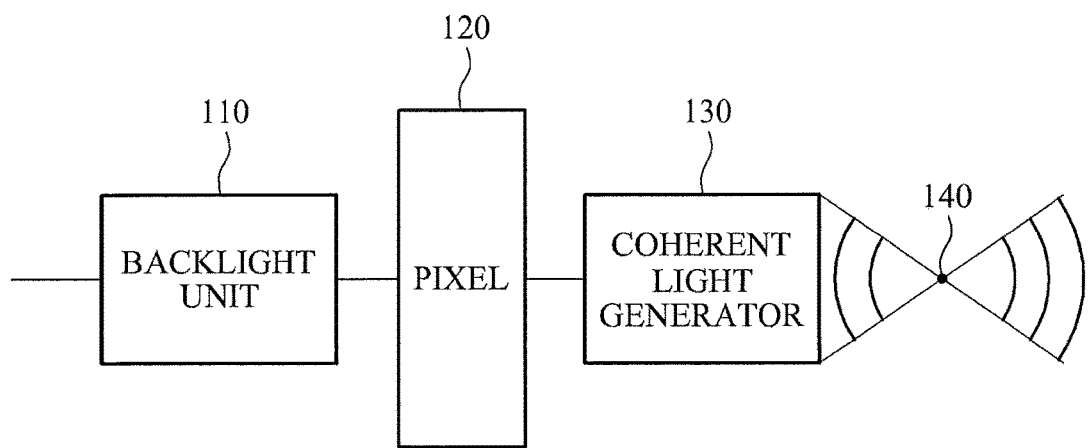
FIG. 1 illustrates a block diagram of an example of a wide-angle coherent light generation apparatus according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

A hologram may be generated based on interference of coherent light. The term "coherent light" may refer to light that optically causes interference, and may typically refer to light having the same wavelength, that is, light of a single wavelength. To control the interference, light phase information may be required to be recognized in advance.

Typically, to simultaneously generate a plurality of coherent lights, a slit may be used. A micro-display using a liquid crystal on silicon (LCoS) technology is frequently used in hologram experiments and the like. A micro-display with two million pixels in a size of 0.7 inch may be currently implemented. The micro-display may have a pixel width of about 8 micrometers (μm), and an angle of diffraction of 3.9°. The micro-display may be insufficient to be used as a commercial display in terms of a size and a light generation angle.

To implement a hologram in a wide viewing angle, an active rendering technology through tracking of a user's eyes may be used. Such a display may have a relatively low specification, for example, about fifteen million pixels. The active rendering display may provide a viewing angle of 15° in a 20-inch screen through eye tracking, despite an angle of diffraction of about 0.2°. However, use of the display is limited to a single person, and a luminance is still low.

As described above, a large amount of research is being conducted to implement a hologram on a large screen and with a wide angle. However, since devices implemented until now use a large amount of pixel resources, it may be difficult to apply the devices as a display.

Light may behave as an electromagnetic wave due to a temporal and spatial variation in an electromagnetic field, and may be generated by a change in movement of electrons. Accordingly, light may include information regarding a wavelength, an amplitude, and a phase that are characteristics of a wave. Because light is typically generated by a plurality of electrons at the same time, light may have a group property. Accordingly, light may be represented as a result of combination of a large number of waves with different wavelengths, different amplitudes, and different phases.

Holography may be described as a technique that represents light in space through constructive interference and destructive interference of a plurality of waves in a predetermined position. To represent a hologram, coherent light enabling mutual interference may be required. For example, light with a single wavelength may be used to represent a hologram, due to coherence of the light.

FIG. 1 illustrates a block diagram of an example of a wide-angle coherent light generation apparatus according to example embodiments.

The wide-angle coherent light generation apparatus of FIG. 1 may include, for example, a backlight unit 110, and a coherent light generator 130.

The backlight unit 110 may generate light that is parallel to a surface on which a pixel 120 has been placed. For example, the backlight unit 110 may generate light with a single wavelength. To generate the parallel light, the backlight unit 110 may use a variety of different light sources, for example, a light emitting diode (LED), and the like. In an embodiment, the backlight unit 110 may generate coherent light or collimated light, or both.

The coherent light generator 130 may focus the parallel light generated by the backlight unit 110 onto a focal point 140, and may thereby generate coherent light at a wide angle. The coherent light generator 130 may correspond to, for example, a variety of optical devices with various shapes that are configured to focus parallel light onto a single focal point.

The coherent light generator 130 may be located at a rear side of the surface on which the pixel 120 has been placed, and may focus light passing through the pixel 120 onto the focal point 140. For example, the coherent light generator 130 may be located on a surface opposite the surface at which the backlight unit 110 is disposed.

In an embodiment, the coherent light generator 130 may be, for example, a lens. The lens may focus the parallel light generated by the backlight unit 110 onto the focal point 140, based on a phase difference caused by a difference between lengths of optical paths through which the parallel light travels in two media with different refractive indices.

For example, based on a shape of a lens, lengths of optical paths through which parallel light travels may be different from each other. Based on a difference between the lengths of the optical paths, phases of parallel light that is simultaneously incident on the lens may be different from each other. Based on a difference between the phases, the parallel light may be focused onto a single focal point, and may be propagated from the focal point at the same angle as an angle at which the parallel light is incident on the lens. The propagated light may indicate coherent light, and may be used to generate a hologram through constructive interference and destructive interference.

The lens may be either a convex lens or a concave lens. A focal point of the convex lens may be placed at a rear side of the convex lens, with respect to a direction in which light travels. A focal point of the concave lens may be placed at a front side of the concave lens, with respect to a direction in which light travels.

In another embodiment, the coherent light generator 130 may be, for example, a phase modulator. The phase modulator may change a refractive index of a central portion of an optical axis and a refractive index of a peripheral portion of the optical axis so that the refractive indices may be different from each other, and may focus the parallel light generated by the backlight unit 110 onto the focal point 140 based on a phase difference caused by a position of an optical path through which the parallel light travels.

For example, the phase modulator may enable a refractive index of a central portion of an optical axis to be different from a refractive index of a peripheral portion of the optical axis. Based on a difference between the refractive indices, phases of parallel light that is simultaneously incident on the phase modulator may be different from each other. Based on a difference between the phases, the parallel light may be focused onto a single focal point, and may be propagated from the focal point at the same angle as an angle at which the parallel light is incident on the phase modulator. The propagated light may indicate coherent light, and may be used to generate a hologram through interference.

In another embodiment, the coherent light generator 130 may be, for example, a phase modulating grating. The phase modulating grating may focus the parallel light onto the focal point 140, based on a phase difference caused by a difference between lengths of a plurality of different optical paths through which the parallel light travels.

For example, based on a shape of a phase modulating grating, lengths of optical paths through which parallel light travels may be different from each other. Based on a difference between the lengths of the optical paths, phases of parallel light that is simultaneously incident on the phase modulating grating may be different from each other. Based on a difference between the phases, the parallel light may be focused onto a single focal point, and may be propagated from the focal point at the same angle as an angle at which the parallel light is incident on the phase modulating grating. The propagated light may indicate coherent light, and may be used to generate a hologram through interference.

The coherent light generator 130 may be, for example, an amplitude modulating grating. The amplitude modulating grating may focus the parallel light onto the focal point 140, based on an amplitude difference, by blocking a part of a plurality of optical paths through which the parallel light travels.

For example, the amplitude modulating grating may partially block the travel of parallel light and accordingly, amplitudes of light passing through the amplitude modulating grating may be different from each other. Based on a difference between the amplitudes, the parallel light may be focused onto a single focal point, and may be propagated from the focal point at the same angle as an angle at which the parallel light is incident on the amplitude modulating grating. The propagated light may indicate coherent light, and may be used to generate a hologram through interference.

A focal point onto which parallel light is focused by the coherent light generator 130 may be calculated by Equation 1 below:

$$f = 2/p \cot(\theta/2) \qquad \text{[Equation 1]}$$

In Equation 1, f denotes a focal point, p denotes a width of a pixel, and θ denotes a spatial angle of coherent light propagated from a focal point. When light is focused onto a focal point and propagated by a coherent light generator that will be further described below, coherent light may be formed at a wide spatial angle. As shown in Equation 1, the spatial angle θ may be set to at least 15°, at least 30°, or at least 60°, by adjusting the width p and the focal point f. Additionally, a light generation apparatus with the spatial angle θ of at least 15°, at least 30°, or at least 60° through adjustment of the focal point f, despite the width p being limited to a few μm or at least 10 μm, may be implemented.

Figure 2:
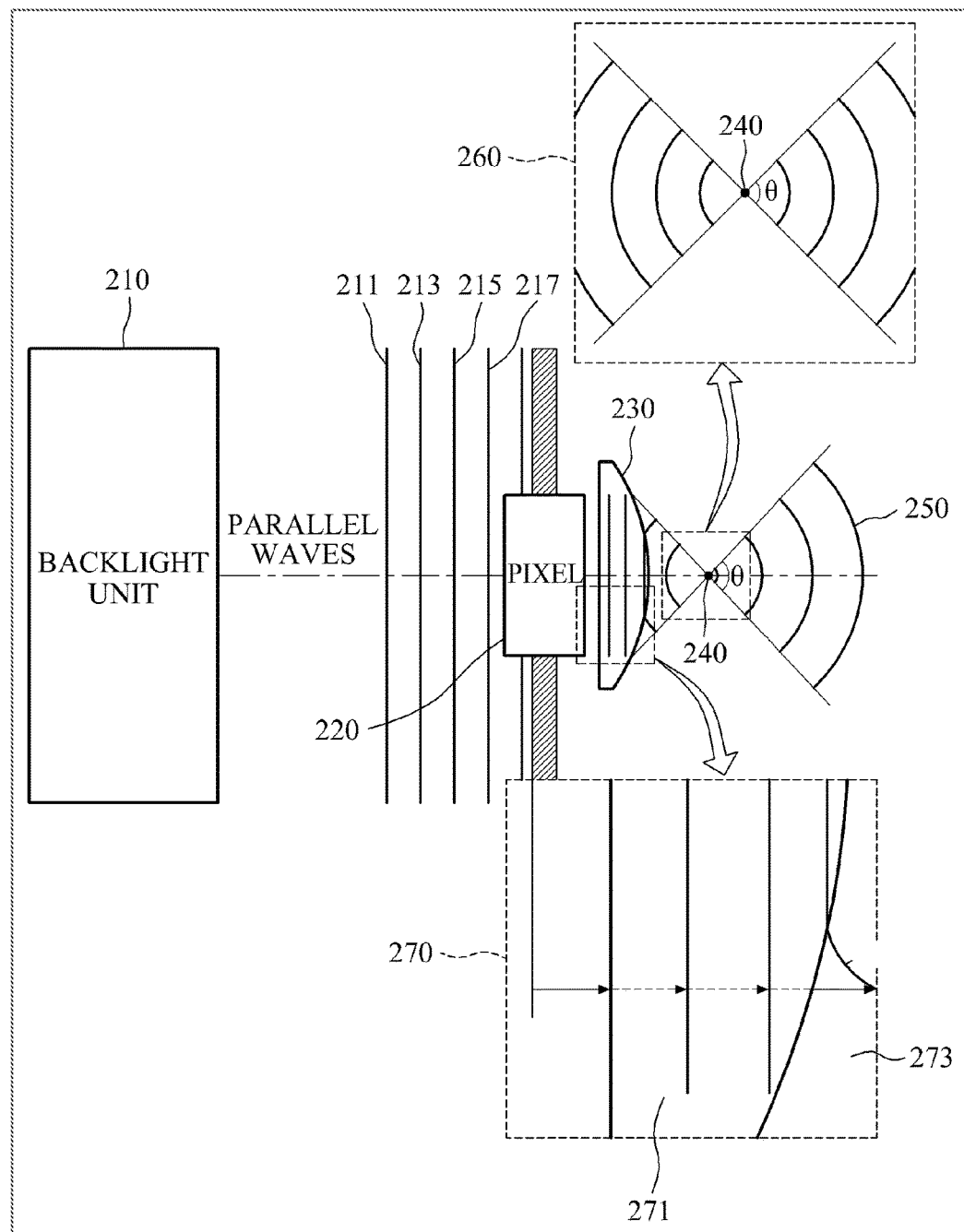
FIG. 2 illustrates a diagram of an example in which a lens is used as a coherent light generator according to example embodiments.

FIG. 2 illustrates a diagram of an example in which a lens is used as a coherent light generator according to example embodiments.

Referring to FIG. 2, a backlight unit 210 may generate parallel waves 211, 213, 215 and 217, namely, light that is parallel to a surface on which a pixel 220 has been placed. In an embodiment, the backlight unit 210 may generate coherent light or collimated light, or both. A lens 230 may be located at a rear side of the pixel 220. Light passing through the pixel 220 may be focused onto a focal point 240, by passing through the lens 230. Light 250 passing through the focal point 240 may be propagated at a wide angle θ.

In box 270 showing light passing through the lens 230, a refraction index of a portion 271 of the lens 230 may be different from a refractive index of air 273, and lengths of optical paths through which light travels may be different from each other, which may cause a phase difference. Based on the phase difference, the light passing through the lens 230 may be focused onto a single focal point, for example, the focal point 240.

In a box 260 showing the focal point 240 onto which the light passing through the lens 230 is focused, the light may be focused onto the focal point 240 at the wide angle θ, and may be propagated at the wide angle θ. The propagated light may be used to form a hologram through interference.

The lens 230 may include, for example, any and all lenses enabling light to be focused onto the focal point 240. Light passing through the pixel 220 may be refracted by the lens 230, may be focused onto the focal point 240, and may continue to be propagated.

Light incident on a surface of the lens 230 may be propagated at speeds of the light that is reduced in inverse proportion to a refractive index of the lens 230. The lens 230 may have a spherical surface or a parabolic surface. Accordingly, a phase of light far from a center of an optical axis may become faster due to a short optical path passing through the lens 230, and a phase of light in the center of the optical axis may become slower due to a long optical path passing through the lens 230.

Light incurring a phase change while passing through the lens 230 may travel towards the focal point 240, and circular wave fronts of the light may be formed. The light may be propagated while maintaining the circular wave fronts, despite passing through the focal point 240. In the focal point 240, light may have a single phase, and may be propagated with a single wavelength and accordingly, coherence may be maintained and light may be propagated at a wide angle. For example, when lenses with the same shape are arranged for each pixel, coherent light with the same phase may be generated at each focal point, and may be propagated at a wide angle.

By controlling a wide-angle coherent light, a hologram image may be generated in a desired position through constructive interference and destructive interference.

Figure 3:
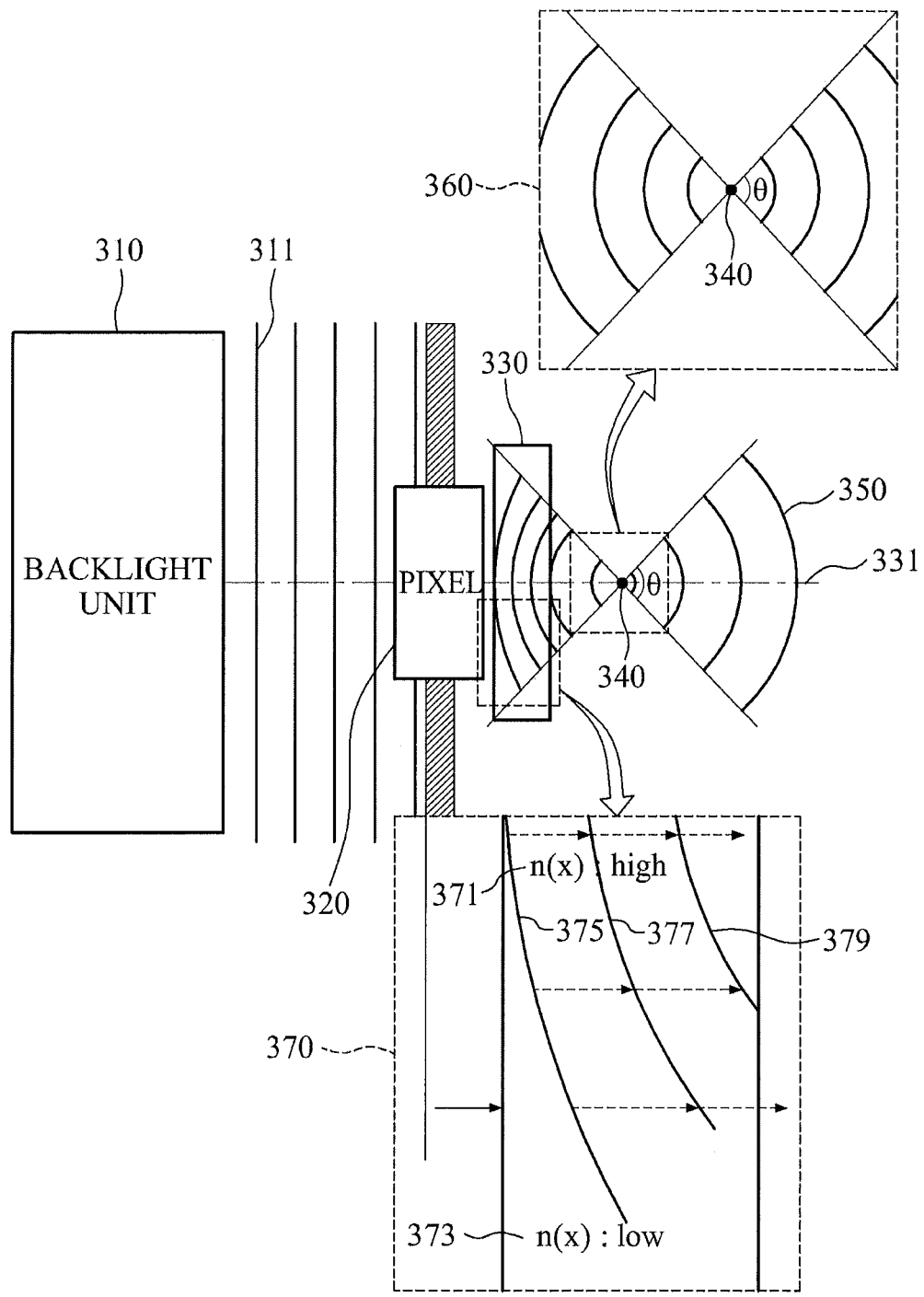
FIG. 3 illustrates a diagram of an example in which a phase modulator is used as a coherent light generator according to example embodiments.

FIG. 3 illustrates a diagram of an example in which a phase modulator is used as a coherent light generator according to example embodiments.

Referring to FIG. 3, a backlight unit 310 may generate parallel wave 311, namely, light that is parallel to a surface on which a pixel 320 has been placed. A phase modulator 330 may be located in a rear side of the pixel 320, that is, in a right side of the pixel 320. Light passing through the pixel 320 may be focused onto a focal point 340, by passing through the phase modulator 330. Light 350 passing through the focal point 340 may be propagated at a wide angle θ.

In a box 370 showing light passing through the phase modulator 330, a portion 371 of the phase modulator 330 that is close to an optical axis 331 may be different in a refractive index n(x) from a portion 373 of the phase modulator 330 that is far from the optical axis 331, which may cause a phase difference. Based on the phase difference, the light passing through the phase modulator 330 may have circular wave fronts 375, 377 and 379, and may be focused onto a single focal point, for example, focal point 340.

In a box 360 showing focal point 340 onto which the light passing through the phase modulator 330 is focused, the light may be focused onto focal point 340 at wide angle θ, and may be propagated at wide angle θ.

The phase modulator 330 may have different refractive indices based on a central portion of the optical axis 331. In the example of FIG. 2, light may be focused using the lens 230, based on the phase difference caused by the difference between the lengths of the optical paths in two media with different refractive indices. In the example of FIG. 3, a refractive index of the central portion of the optical axis 331, and a refractive index of a peripheral portion of the optical axis 331 may be continuously changed, despite the same absolute lengths of optical paths, and accordingly the light passing through the phase modulator 330 may have different phases based on a position.

The phase modulator 330 may be implemented, for example, using a holographic optical element (HOE).

Figure 4:
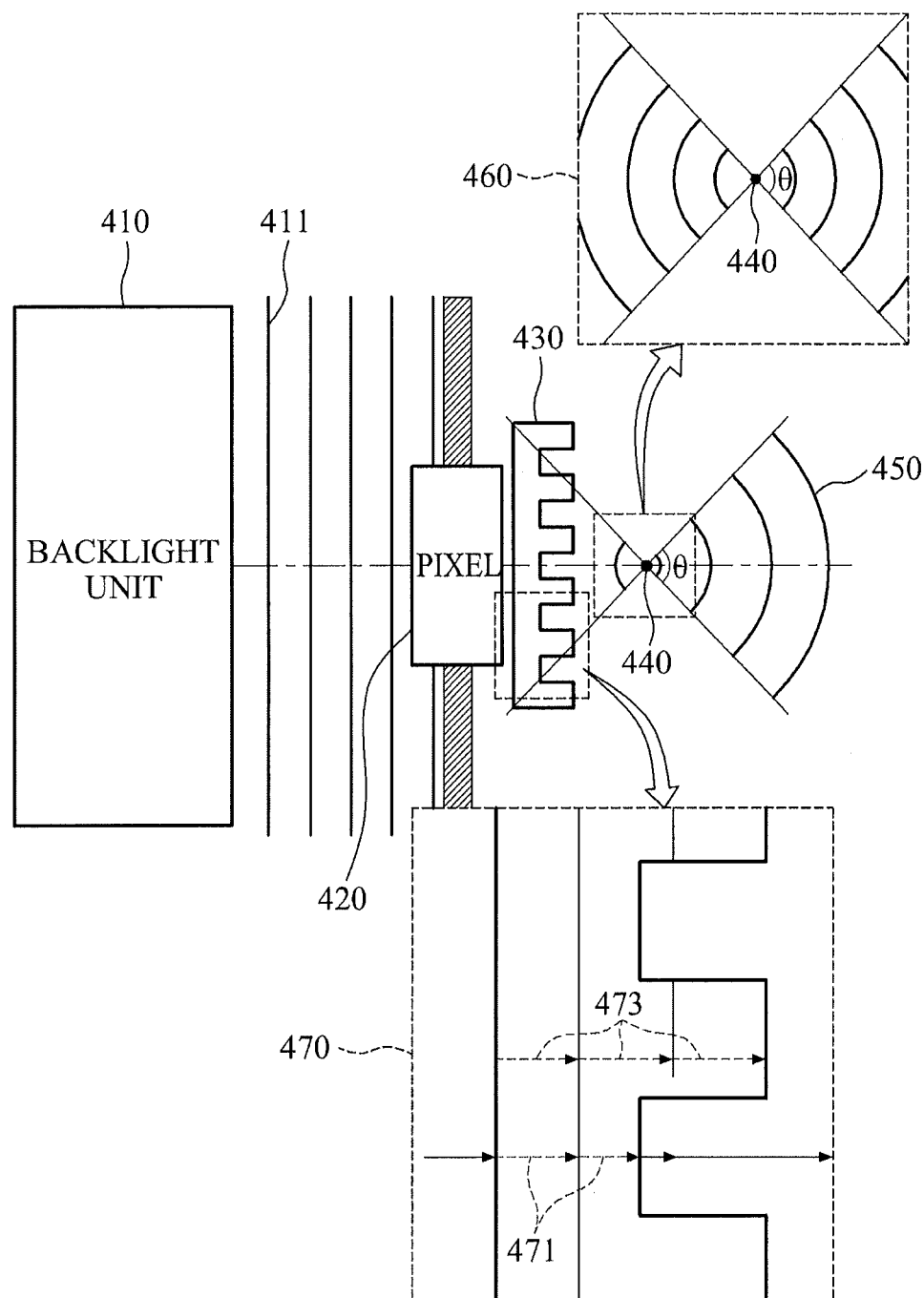
FIG. 4 illustrates a diagram of an example in which a phase modulating grating is used as a coherent light generator according to example embodiments.

FIG. 4 illustrates a diagram of an example in which a phase modulating grating is used as a coherent light generator according to example embodiments.

Referring to FIG. 4, a backlight unit 410 may generate parallel wave 411, namely, light that is parallel to a surface on which a pixel 420 has been placed. A phase modulating grating 430 may be located at a rear side of the pixel 420, that is, at a right side of the pixel 420. Light passing through the pixel 420 may be focused onto a focal point 440, by passing through the phase modulating grating 430. Light 450 passing through the focal point 440 may be propagated at a wide angle θ. The phase modulating grating 430 may be generated in a form of sawteeth, for example.

In a box 470 showing light passing through the phase modulating grating 430, a concave portion 471 of the phase modulating grating 430 may result in a different optical path length than a convex portion 473 of the phase modulating grating 430, which may cause a phase difference. Based on the phase difference, the light passing through the phase modulating grating 430 may be focused onto a single focal point, for example, the focal point 440.

In a box 460 showing the focal point 440 onto which the light passing through the phase modulating grating 430 are focused, the light may be focused onto the focal point 440 at the wide angle θ, and may be propagated at the wide angle θ.

The phase modulating grating 430 may be fabricated with high precision using an etching scheme, or other scheme and accordingly, may be implemented with uniform characteristics in a large area.

Figure 5:
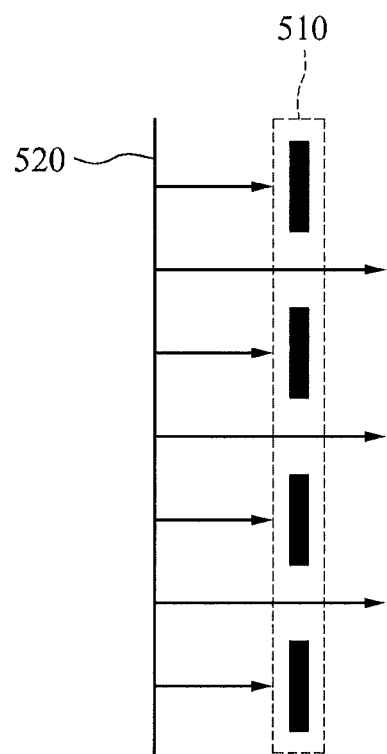
FIG. 5 illustrates a diagram of an example in which an amplitude modulating grating is used as a coherent light generator according to example embodiments.

FIG. 5 illustrates a diagram of an example in which an amplitude modulating grating is used as a coherent light generator according to example embodiments.

Referring to FIG. 5, light 520 may be focused onto a focal point, by passing through an amplitude modulating grating 510. The light 520 passing through the focal point may be propagated at a wide angle θ.

The light 520 may pass through a part of the amplitude modulating grating 510, or may not pass through another part of the amplitude modulating grating 510. Based on whether the light 520 passes through the amplitude modulating grating 510, or not, the amplitude of the light 520 may be different. Based on a difference between the amplitude, light passing through the amplitude modulating grating 510 may be focused onto a single focal point.

Figure 6:
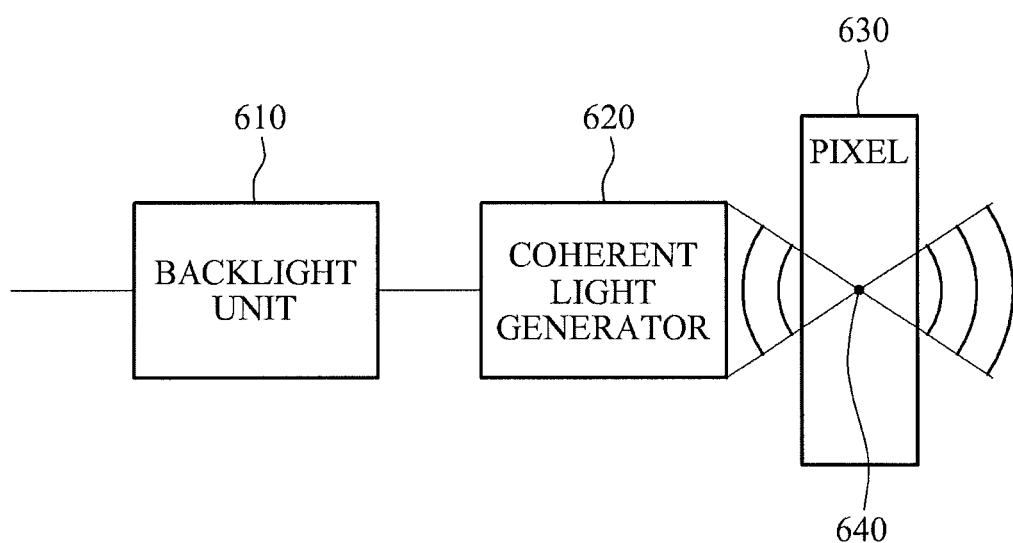
FIG. 6 illustrates a block diagram of another example of a wide-angle coherent light generation apparatus according to example embodiments.

FIG. 6 illustrates a block diagram of another example of a wide-angle coherent light generation apparatus according to example embodiments.

The wide-angle coherent light generation apparatus of FIG. 6 may include, for example, a backlight unit 610 and a coherent light generator 620.

The backlight unit 610 may generate light that is parallel to a surface on which a pixel 630 has been placed. For example, the backlight unit 610 may generate light with a single wavelength. To generate the parallel light, the backlight unit 610 may use various light sources, for example, an LED, and the like.

The coherent light generator 620 may focus the parallel light generated by the backlight unit 610 onto a focal point

640, and may generate coherent light at a wide angle. The coherent light generator 620 may correspond to, for example, various optical devices with various shapes that are configured to focus parallel light onto a single focal point. For example, coherent light generator 620 may correspond to a lens, a phase modulator, a phase modulating grating, or an amplitude modulating grating.

The coherent light generator 620 may be located at a front side of the surface on which the pixel 630 has been placed, and may focus the parallel light onto the focal point 640, before the parallel light passes through the pixel 630.

Figure 7:
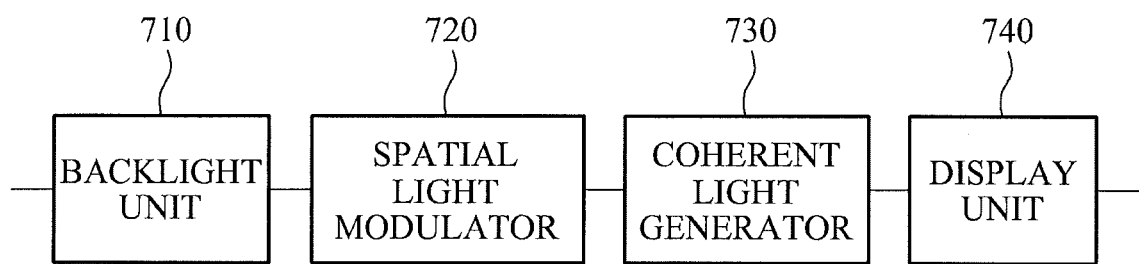
FIG. 7 illustrates a block diagram of a display apparatus using a wide-angle coherent light according to example embodiments.

FIG. 7 illustrates a block diagram of a display apparatus using a wide-angle coherent light according to example embodiments.

The display apparatus of FIG. 7 may include, for example, a backlight unit 710, a spatial light modulator 720, a coherent light generator 730, and a display unit 740.

The backlight unit 710 may generate light that is parallel to a surface on which a plurality of pixels are placed. In an embodiment, the backlight unit 710 may generate coherent light or collimated light, or both. The backlight unit 710 may generate light with a single wavelength. To generate the parallel light, the backlight unit 710 may use various light sources, for example, an LED, and the like.

The spatial light modulator 720 may include a plurality of pixels, and may modulate a phase or an amplitude of parallel light passing through the plurality of pixels. The spatial light modulator 720 may be located for each of pixels. The spatial light modulator 720 may modulate a phase or an amplitude of light passing through a pixel.

The phase or the amplitude modulated by the spatial light modulator 720 may be reflected on coherent light at a wide angle by the coherent light generator 730, and may be used as a source to restore a 3D image in a space by the display unit 740.

The coherent light generator 730 may focus the parallel light that has the modulated phase or the modulated amplitude onto a focal point, and may generate coherent light at the wide angle.

In an embodiment, the coherent light generator 730 may be, for example, a lens. The lens may focus the parallel light onto the focal point, based on a phase difference caused by a difference between lengths of optical paths through which the parallel light travels in two media with different refractive indices. The lens may be either a convex lens, or a concave lens.

In another embodiment, the coherent light generator 730 may be, for example, a phase modulator. The phase modulator may change a refractive index of a central portion of an optical axis and a refractive index of a peripheral portion of the optical axis so that the refractive indices may be different from each other, and may focus the parallel light onto the focal point based on a phase difference caused by a position of an optical path through which the parallel light travels.

In another embodiment, the coherent light generator 730 may be, for example, a phase modulating grating. The phase modulating grating may focus the parallel light onto the focal point, based on a phase difference caused by a difference between lengths of a plurality of different optical paths through which the parallel light travels.

In another embodiment, the coherent light generator 730 may be, for example, an amplitude modulating grating. The amplitude modulating grating may focus the parallel light onto the focal point, based on an amplitude difference, by blocking a part of a plurality of optical paths through which the parallel light travels.

The display unit 740 may display a 3D image in space, based on interference of coherent light generated at a wide angle for each of the plurality of pixels. For example, the display unit 740 may display a 3D image on a hologram surface, using coherent light generated at a wide angle for each pixel. The display unit 740 may include, for example, a liquid crystal display (LCD), a thin film transistor-LCD (TFT-LCD), an organic LED (OLED), a flexible display, and the like, however, there is no limitation thereto.

Figure 8:
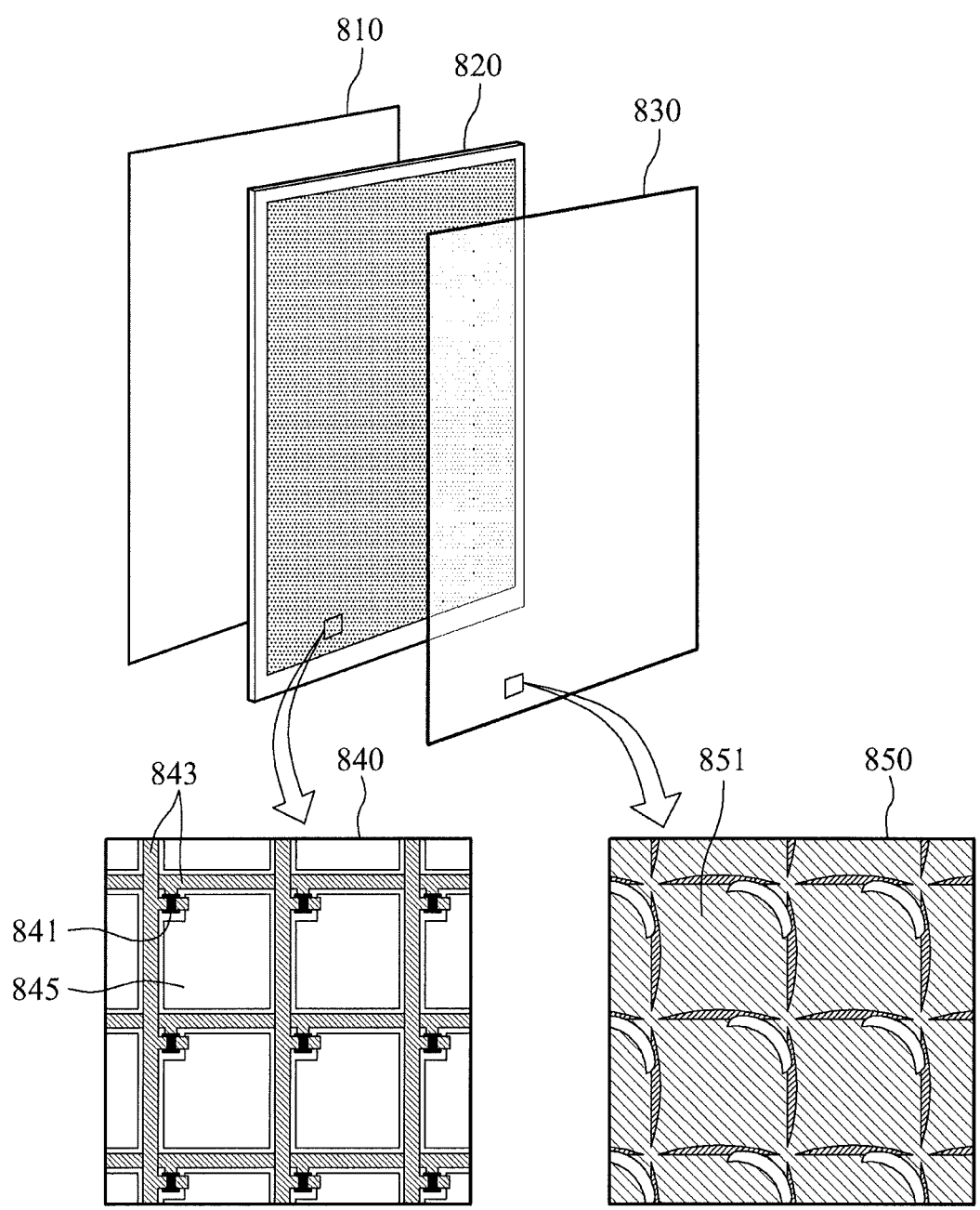
FIG. 8 illustrates a diagram of an example of a structure of a display apparatus using a wide-angle coherent light according to example embodiments.

FIG. 8 illustrates a diagram of an example of a structure of a display apparatus using a wide-angle coherent light according to example embodiments.

The display apparatus of FIG. 8 may include, for example, a backlight unit 810, a display panel 820, and an optical unit 830.

The backlight unit 810 may generate parallel light that is parallel to the display panel 820.

The display panel 820 may be used as a spatial light modulator, and may have a structure enabling modulation of a phase or an amplitude of light. The display panel 820 may be configured with pixels in a lattice or grid-like pattern.

In a box 840 showing an enlarged portion of the display panel 820, the display panel 820 may include a transistor 841, a pixel 845 and an electrode 843 in a structure of a black matrix. The transistor 841 may include, for example, a TFT, and the pixel 845 may include, for example, an indium tin oxide (ITO) film.

In a box 850 showing a portion of the optical unit 830, a coherent light generator 851 may be disposed so as to correspond to the pixel 845. That is, the coherent light generator 851 may be located along a planar surface of the pixel 845 so that light passing through the pixel 845 may be focused onto a focal point. The coherent light generator 851 may include, for example, one or more of a lens, a phase modulator, a phase modulating grating, and an amplitude modulating grating, as described above in FIGS. 2 through 5. The coherent light generator 851 may be disposed at a front side of the pixel 845. Conversely, the coherent light generator 851 may be disposed at a rear side of the pixel 845 of the display panel 820. In either embodiment, the optical axis of the coherent light generator 851 may be generally aligned at the center of the pixel 845 of the display panel 820. In another embodiment the optical axis may be disposed with an amount of offset from the center of the pixel for directing the generated coherent light to a specific position in a space. In yet another embodiment, when the coherent light generator 851 is located in front of the pixel 845 of the display panel 820, it is recommended to minimize the gap between the coherent light generator 851 and the pixel 845 of the display panel 820 to reduce the light diffraction effect at the pixel. In still another embodiment, when the coherent light generator 851 is located at the rear of the pixel 845 of the display panel 820, it is recommended to locate the display panel 820 at the focal plane of the pixel 845 of the coherent light generator 851 to prevent the loss of light by any light blocking mask between pixels.

Figure 9:
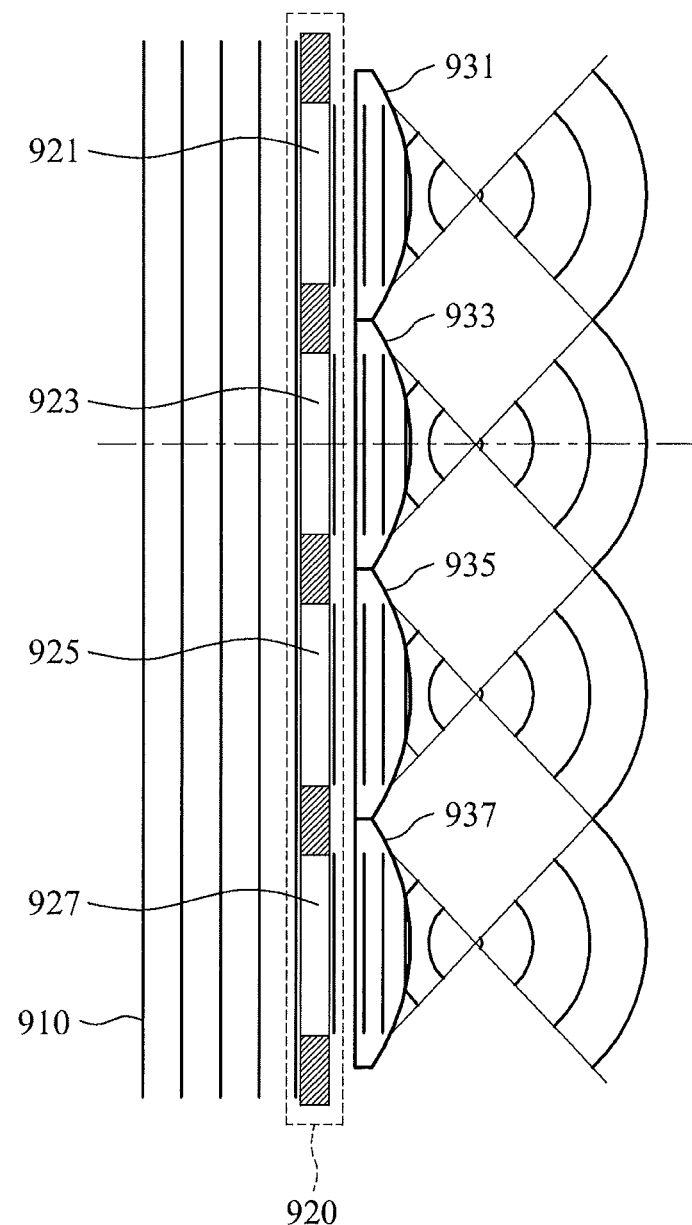
FIGS. 9 and 10 illustrate diagrams of other examples of a structure of a display apparatus using a wide-angle coherent light according to example embodiments.

In FIG. 9, a lens may be used as a coherent light generator. A lens may disposed so as to correspond to each pixel of a spatial light modulator.

Figure 10:
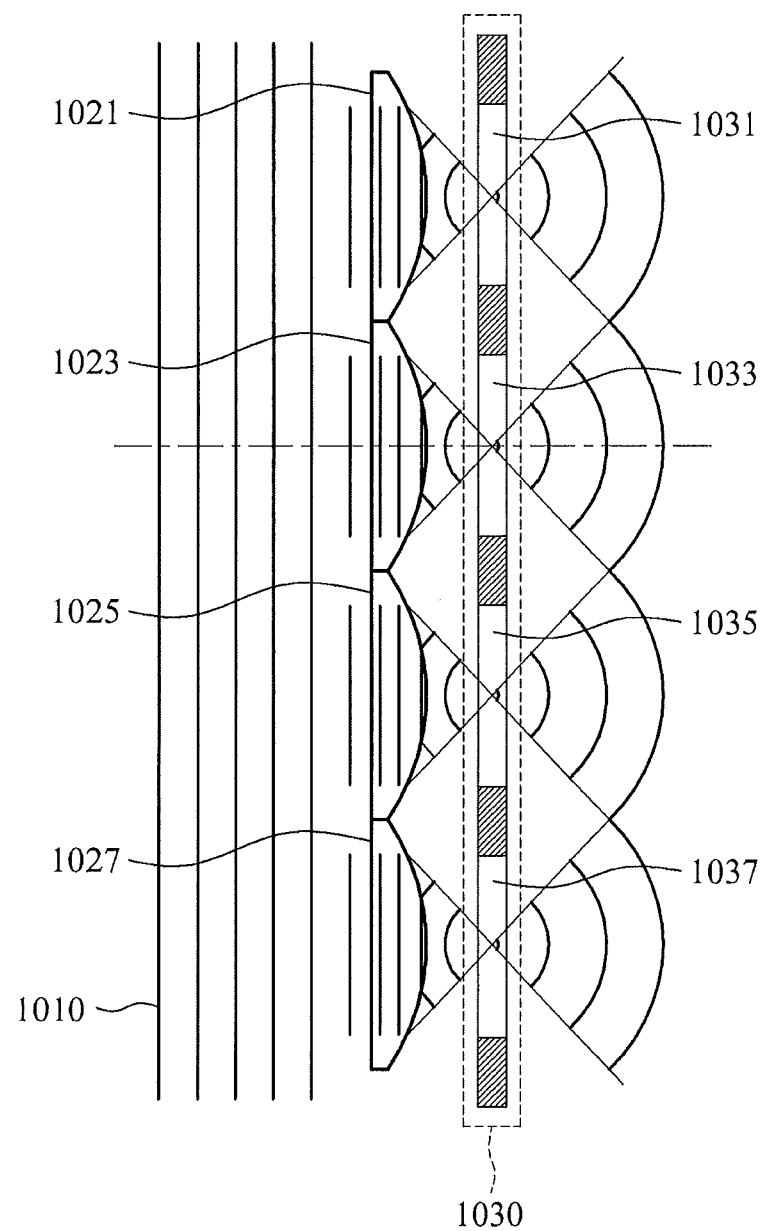

FIGS. 9 and 10 illustrate diagrams of other examples of a structure of a display apparatus using a wide-angle coherent light according to example embodiments.

FIG. 9 illustrates an example of arrangement of coherent light generators 931, 933, 935, and 937. The coherent light generators 931, 933, 935, and 937 may be arranged at a front side of a display panel 920. The coherent light generators 931, 933, 935, and 937 may be disposed so as to correspond to pixels 921, 923, 925, and 927 of the display panel 920, respectively. A phase or an amplitude of parallel light 910 may be modulated in the display panel 920. The parallel light 910 with the modulated phase or the modulated amplitude may pass through the coherent light generators 931, 933, 935, and 937, may be focused onto focal points, and may be propagated at wide angles from the focal points, respectively.

FIG. 10 illustrates an example of arrangement of coherent light generators 1021, 1023, 1025, and 1027. The coherent light generators 1021, 1023, 1025, and 1027 may be arranged at a rear side of a display panel 1030. The coherent light generators 1021, 1023, 1025, and 1027 may be disposed so as to correspond to pixels 1031, 1033, 1035, and 1037 of the display panel 1030, respectively. Parallel light 1010 may pass through the coherent light generators 1021, 1023, 1025, and 1027, and may be focused onto focal points on the display panel 1030. A phase or an amplitude of the parallel light 1010 may be modulated in the display panel 1020, and the parallel light 1010 with the modulated phase or the modulated amplitude may be propagated at wide angles from the focal points, respectively.

Figure 11:
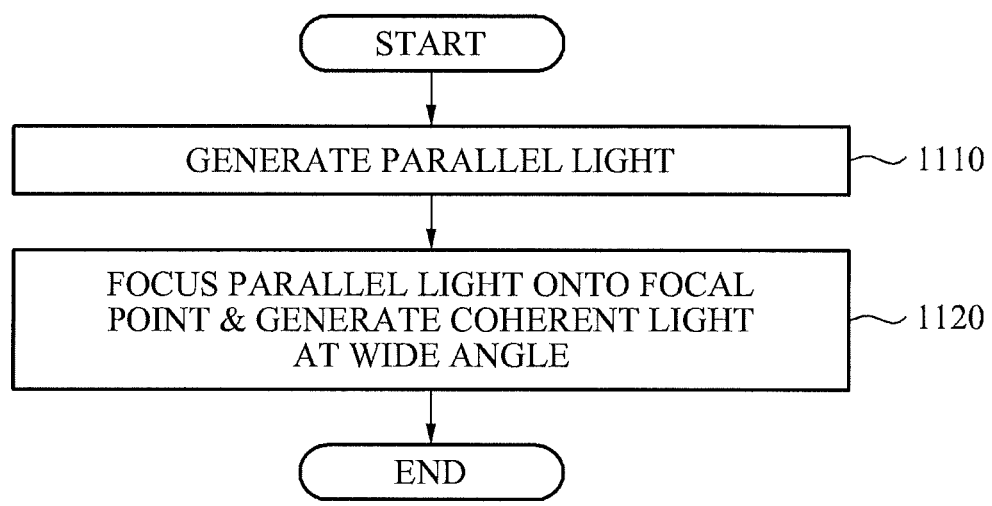
FIG. 11 illustrates a flowchart of a wide-angle coherent light generation method according to example embodiments.

FIG. 11 illustrates a flowchart of a wide-angle coherent light generation method according to example embodiments.

Referring to FIG. 11, in 1110, a wide-angle coherent light generation apparatus may generate light that is parallel to a surface on which a pixel has been placed. For example, the wide-angle coherent light generation apparatus may generate light with a single wavelength. To generate the parallel light, the wide-angle coherent light generation apparatus may use various light sources, for example, an LED, and the like.

In 1120, the wide-angle coherent light generation apparatus may focus the parallel light onto a focal point, and may generate coherent light at a wide angle, based on light propagated from the focal point.

By using a lens, the wide-angle coherent light generation apparatus may focus the parallel light onto the focal point based on a phase difference caused by a difference between lengths of optical paths through which the parallel light travels in two media with different refractive indices.

By using a phase modulator, the wide-angle coherent light generation apparatus may change a refractive index of a central portion of an optical axis and a refractive index of a peripheral portion of the optical axis so that the refractive indices may be different from each other, and may focus the parallel light onto the focal point based on a phase difference caused by a position of an optical path through which the parallel light travels.

By using a phase modulating grating, the wide-angle coherent light generation apparatus may focus the parallel light onto the focal point, based on a phase difference caused by a difference between lengths of a plurality of different optical paths through which the parallel light travels.

By using an amplitude modulating grating, the wide-angle coherent light generation apparatus may focus the parallel light onto the focal point, based on an amplitude difference, by blocking a part of a plurality of optical paths through which the parallel light travels.

As described above, according to example embodiments, by using an optical device, a wide-angle coherent light generation apparatus may enable light generated in each pixel to have a wide viewing angle.

Additionally, according to example embodiments, a wide-angle coherent light generation apparatus may generate coherent light at a wide angle, using an optical device, while maintaining a pixel width at an existing commercial display level, for example, at least 100 μm.

Furthermore, according to example embodiments, to represent a hologram image, a wide-angle coherent light generation apparatus may generate coherent light at a wide angle, even in a pixel having a relatively great width, using an optical device, and may be widely utilized in a field to represent a 3D image, for example, a holographic display, holographic printing, and the like.

The above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The non-transitory computer-readable media may also be a distributed network, so that the program instructions are stored and executed in a distributed fashion. The program instructions may be executed by one or more processors. The non-transitory computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Any one or more of the software modules described herein may be executed by a dedicated hardware-based computer or processor unique to that unit or by a hardware-based computer or processor common to one or more of the modules. The described methods may be executed on a general purpose computer or processor or may be executed on a particular machine such as the coherent light generation apparatus described herein.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. A coherent light generation apparatus, comprising:
a backlight unit to generate parallel light;
a coherent light generator; and
plural pixels disposed between the backlight unit and the coherent light generator,
wherein the coherent light generator is configured to focus the parallel light onto corresponding focal points for each of the plural pixels to generate respective coherent light for each of the plural pixels to form a hologram based on interference of light propagated from each of the focal points, wherein no slit is included in the coherent light generation apparatus, and wherein f=2/p cot(θ/2), where f denotes a focal point, p denotes a width of a pixel, and θ denotes a spatial angle of coherent light propagated from a focal point.

2. The coherent light generation apparatus of claim 1, wherein the coherent light generator comprises respective lenses to perform the respective focusing of the parallel light onto each of the focal points, based on respective phase differences caused by respective differences between lengths of optical paths through which corresponding parallel light travels in respective two media of the lenses with different refractive indices.

3. The coherent light generation apparatus of claim 2, wherein the lenses comprise at least one of a convex lens and a concave lens.

4. The coherent light generation apparatus of claim 1, wherein the coherent light generator comprises a phase modulator to change a refractive index of a central portion of an optical axis and a refractive index of a peripheral portion of the optical axis so that the refractive indices are different from each other, and to focus the parallel light onto one of the focal points based on a phase difference caused by a varying position of an optical path through which the parallel light travels.

5. The coherent light generation apparatus of claim 1, wherein the coherent light generator comprises a phase modulating grating to focus the parallel light onto one of the focal points, based on a phase difference caused by a difference between lengths of a plurality of different optical paths through which the parallel light travels.

6. The coherent light generation apparatus of claim 1, wherein the coherent light generator comprises an amplitude modulating grating to focus the parallel light onto one of the focal points, based on an amplitude difference, by blocking a part of a plurality of optical paths through which the parallel light travels.

7. The coherent light generation apparatus of claim 1, wherein the light propagated from the focal point comprises a wide angle of at least 15°.

8. The coherent light generation apparatus of claim 7, wherein the light propagated from the focal point comprises a wide angle of at least 30°.

9. The coherent light generation apparatus of claim 8, wherein the light propagated from the focal point comprises a wide angle of at least 60°.

10. The coherent light generation apparatus of claim 7, wherein each of the pixels has a width of at least 10 micrometers (μm).

11. A coherent light generation apparatus, comprising:
a backlight unit to generate parallel light; and
a coherent light generator to focus the parallel light from a pixel onto a focal point, and to generate coherent light so that a hologram is formed based on interference of light propagated from the focal point,
wherein the light propagated from the focal point has a wide angle of at least 15°,
wherein no slit is included in the coherent light generation apparatus, and
wherein f=2/p cot(θ/2), where f denotes a focal point, p denotes a width of a pixel, and θ denotes a spatial angle of coherent light propagated from a focal point.

12. A coherent light generation method, comprising:
generating parallel light passing through a pixel; and
focusing parallel light output from the pixel onto a focal point to convert the parallel light output from the pixel into coherent light so that a hologram is formed based on interference of light propagated from the focal point,
wherein the light propagated from the focal point comprises a wide angle of at least 15°, and
wherein f=2/p cot(θ/2), where f denotes a focal point, p denotes a width of a pixel, and θ denotes a spatial angle of coherent light propagated from a focal point.

13. The coherent light generation method of claim 12, wherein the focusing comprises focusing, by a lens, the parallel light onto the focal point, based on a phase difference caused by a difference between lengths of varying optical paths through which the parallel light travels in two media with different refractive indices.

14. The coherent light generation method of claim 12, wherein the focusing comprises changing, by a phase modulator, a refractive index of a central portion of an optical axis and a refractive index of a peripheral portion of the optical axis so that the refractive indices are different from each other, and focusing the parallel light onto the focal point based on a phase difference caused by a varying position of an optical path through which the parallel light travels.

15. The coherent light generation method of claim 12, wherein the focusing comprises focusing, by a phase modulating grating, the parallel light onto the focal point, based on a phase difference caused by a difference between lengths of a plurality of different optical paths through which the parallel light travels.

16. The coherent light generation method of claim 12, wherein the focusing comprises focusing, by an amplitude modulating grating, the parallel light onto the focal point, based on an amplitude difference, by blocking a part of a plurality of optical paths through which the parallel light travels.

17. A non-transitory computer-readable storage medium encoded with computer readable code comprising a program for implementing the method of claim 12.

18. A display apparatus using a coherent light, the display apparatus comprising:
a backlight unit to generate parallel light;
a spatial light modulator to modulate a phase or an amplitude of the parallel light passing through a plurality of pixels, the spatial light modulator comprising the plurality of pixels;
a coherent light generator to respectively focus parallel light output from the plurality of pixels, having the modulated phase or the modulated amplitude, onto corresponding focal points, to generate coherent light for each of the plurality of pixels; and
a display unit to display a three-dimensional (3D) image in a space, based on interference of the coherent light generated for each of the plurality of pixels,
wherein light propagated from the focal point comprises a wide angle of at least 15°, and
wherein f=2/p cot(θ/2), where f denotes a focal point, p denotes a width of a pixel, and θ denotes a spatial angle of coherent light propagated from a focal point.

19. The display apparatus of claim 18, wherein the coherent light generator comprises a lens to focus the parallel light onto one of the focal points, based on a phase difference caused by a difference between varying lengths of optical paths through which the parallel light travels in two media with different refractive indices.

20. The display apparatus of claim 18, wherein the coherent light generator comprises a phase modulator to change a refractive index of a central portion of an optical axis and a refractive index of a peripheral portion of the optical axis so that the refractive indices are different from each other, and to focus the parallel light onto one of the focal points based on a phase difference caused by a varying position of an optical path through which the parallel light travels.

21. The display apparatus of claim 18, wherein the coherent light generator comprises a phase modulating grating to focus the parallel light onto one of the focal points, based on a phase difference caused by a difference between lengths of a plurality of different optical paths through which the parallel light travels.

22. The display apparatus of claim 18, wherein the coherent light generator comprises an amplitude modulating grating to focus the parallel light onto one of the focal points, based on an amplitude difference, by blocking a part of a plurality of optical paths through which the parallel light travels.

23. A coherent light generating apparatus comprising:
a pixel disposed on a planar surface;
a backlight unit to generate coherent and collimated light of a single wavelength that is parallel to the planar surface on which the pixel is disposed; and
a coherent light generator to focus parallel light output from the pixel onto a focal point to convert the parallel light output from the pixel into coherent light,
wherein the pixel is disposed between the backlight unit and the coherent light generator,
wherein no slit is included in the coherent light generation apparatus,
wherein the coherent light generator is disposed at a side of the planar surface to correspond to the pixel, and
wherein $f=2/p \cot(\theta/2)$, where f denotes a focal point, p denotes a width of a pixel, and $\theta$ denotes a spatial angle of coherent light propagated from a focal point.

24. The coherent light generating apparatus of claim 23, wherein the coherent light generator generates the coherent light at a wide angle of at least 30°.

25. A display apparatus comprising:
a plurality of pixels disposed in a grid-like pattern on a planar surface;
a backlight unit to generate coherent and collimated light of a single wavelength that is parallel to the planar surface on which the pixels are disposed;
a plurality of coherent light generators to respectively focus parallel light output from the plurality of pixels onto focal points to respectively generate coherent light, wherein the plurality of pixels are disposed between the backlight unit and the plurality of coherent light generators, and each of the coherent light generators is positioned at a side of the planar surface to correspond to one of the plurality of pixels; and
a display unit to display a three-dimensional (3D) image based on interference of the coherent light respectively generated for each of the plurality of pixels,
wherein no slit is included in the coherent light generation apparatus, and
wherein $f=2/p \cot(\theta/2)$, where f denotes a focal point, p denotes a width of a pixel, and $\theta$ denotes a spatial angle of coherent light propagated from a focal point.

26. The coherent light generating apparatus of claim 25, wherein each of the coherent light generators respectively generates the coherent light at a wide angle of at least 15°.

27. The coherent light generating apparatus of claim 25, wherein each of the coherent light generators is aligned at a center of the corresponding pixel.

28. A coherent light generation apparatus, comprising:
one or more light sources to provide parallel light; and
a coherent light generator to respectively focus the parallel light from a pixel onto plural focal points to generate respective coherent light so that a hologram is formed based on interference of light propagated from the focal points,
wherein the coherent light generation apparatus generates the respective coherent light independent of any diffracting of the parallel light imparted by light modulation of the parallel light before incident on the coherent light generator,
wherein the pixel is disposed between the one or more light sources and the coherent light generator,
wherein no slit is included in the coherent light generation apparatus,
wherein the coherent light generator generates the coherent light at a wide angle of at least 15°, and
wherein $f=2/p \cot(\theta/2)$, where f denotes a focal point, p denotes a width of a pixel, and $\theta$ denotes a spatial angle of coherent light propagated from a focal point.

29. A coherent light generation apparatus, comprising:
one or more light sources to provide parallel light;
plural pixels; and
a coherent light generator to respectively focus the parallel light, incident from each of the pixels or toward each of the pixels, onto different focal points and to convert incident light into respective coherent light so that a hologram is formed based on interference of light propagated from the focal points,
wherein the pixels are disposed between the one or more light sources and the coherent light generator,
wherein no slit is included in the coherent light generation apparatus,
wherein the coherent light generator generates the coherent light at a wide angle of at least 15°, and
wherein $f=2/p \cot(\theta/2)$, where f denotes a focal point, p denotes a width of a pixel, and $\theta$ denotes a spatial angle of coherent light propagated from a focal point.

30. The coherent light generation apparatus of claim 29, wherein the pixels are arranged between the one or more light sources and the coherent light generator.

31. The coherent light generation apparatus of claim 29, wherein the coherent light generator is located at a front side of a surface on which the pixels are placed, between the one or more light sources and the pixels.

32. The coherent light generation apparatus of claim 31, wherein each of the plural pixels has a width of at least 100 micrometers (µm).

33. The coherent light generation apparatus of claim 29, wherein the coherent light generator comprises respective lenses to perform the respective focusing of the parallel light onto each of the focal points, based on respective phase differences caused by respective differences between lengths of optical paths through which corresponding parallel light travels in respective two media of the lenses with different refractive indices.

34. The coherent light generation apparatus of claim 29, wherein the coherent light generator comprises a phase modulator to change a refractive index of a central portion of an optical axis and a refractive index of a peripheral portion of the optical axis so that the refractive indices are different from each other, and to focus the parallel light onto one of the focal points based on a phase difference caused by a varying position of an optical path through which the parallel light travels.

35. The coherent light generation apparatus of claim 29, wherein the coherent light generator comprises a phase modulating grating to focus the parallel light onto one of the focal points, based on a phase difference caused by a difference between lengths of a plurality of different optical paths through which the parallel light travels.

36. The coherent light generation apparatus of claim 29, wherein the coherent light generator comprises an amplitude modulating grating to focus the parallel light onto one of the focal points, based on an amplitude difference, by blocking a part of a plurality of optical paths through which the parallel light travels.

* * * * *